April 14, 1931.  O. K. HILL  1,800,450
CUT-OFF SAWING MACHINE
Filed July 21, 1930
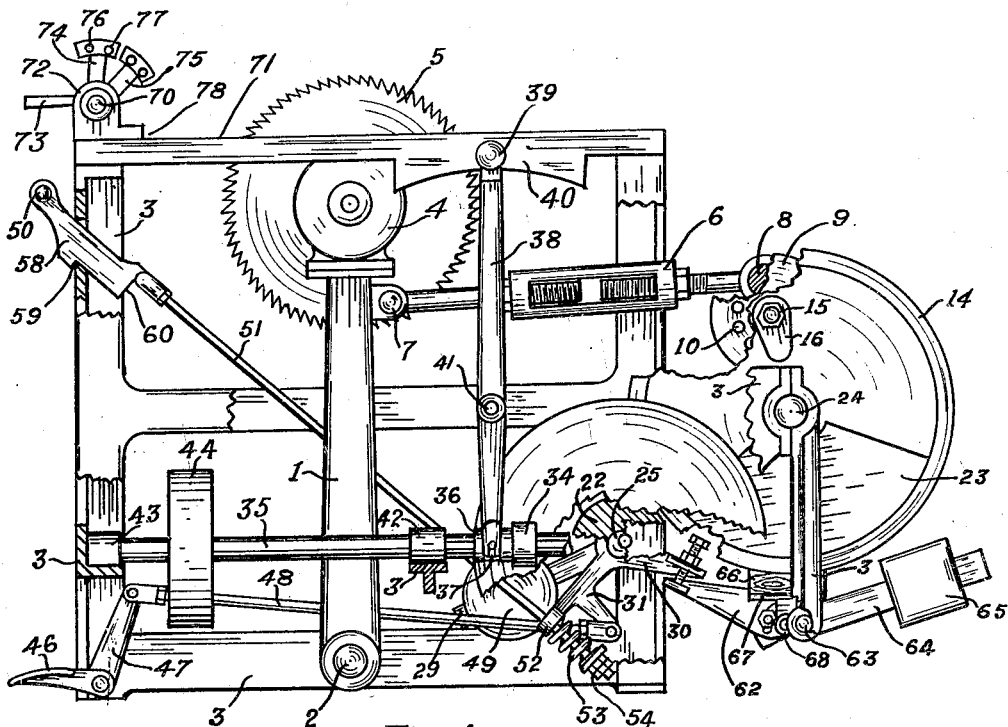
Fig. 1
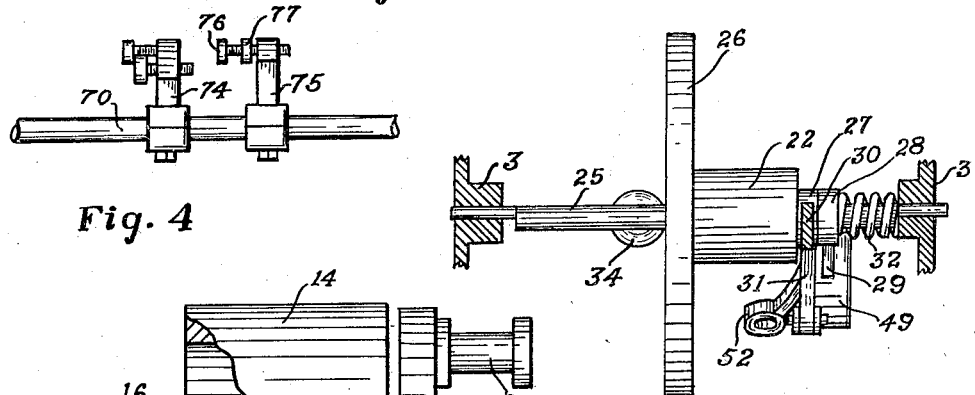
Fig. 4
Fig. 2
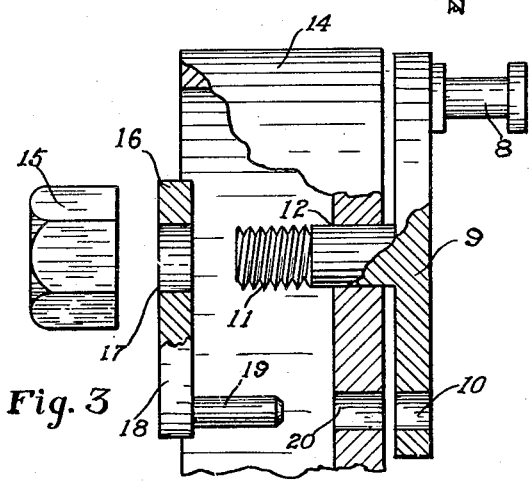
Fig. 3
Inventor
Orrin K. Hill.

Patented Apr. 14, 1931

1,800,450

UNITED STATES PATENT OFFICE

ORRIN K. HILL, OF PORTLAND, OREGON, ASSIGNOR OF ONE-HALF TO ARTHUR E. DE KONING, OF PORTLAND, OREGON

CUT-OFF SAWING MACHINE

Application filed July 21, 1930. Serial No. 469,293.

My invention relates to means for facilitating the accurate and rapid cutting to a variety of lengths of random width lumber.

The principal object of my invention is the provision in a cut-off sawing machine having a mechanically operated swinging saw carriage of means for altering the rate of oscillation of said saw carriage and for the pedal control or automatic oscillation thereof while the machine is in operation, and as well to provide means for altering the amplitude of oscillation of the said carriage and the position of the arc through which the saw moves as related to the gage against which the lumber is fed.

A second object of my invention is the provision of means for gaging and cutting pieces of lumber of slightly different length as well as pieces of great difference in length, as the quality of the lumber being cut permits.

These objects are accomplished by the employment of a variably geared power driven adjustable crank connected to an oscillatory saw carriage by an extensible pitman in which the said variable gearing is susceptible of manual control and wherein the said power driving means for oscillating the saw carriage is engaged intermittently at the will of the operator by means of a pedal gear, or continuously by virtue of an adjustment of a control rod adapted to retain its adjusted position, and a braking gear connected therewith to arrest the motion of the saw carriage and the said crank and pitman automatically upon the disengagement of the said power driving means. A length gage of peculiar construction, susceptible of rapid and fine adjustment, renders the extreme variation of celerity of movement of the saw through the work provided for by the foregoing elements, of practical value.

Other objects and advantages of my invention are apparent in the following discourse wherein the significance of the reference characters in the accompanying drawings, details of construction and operation of a typical machine embodying my invention, and its particular advantages are explained.

Figure 1 represents a view of the entire machine partly in elevation and partly in section from which fragments have been broken away to reveal the relationship of parts thereby disclosed.

Figure 2 represents a view in another aspect than that revealed in Figure 1 of certain elements of the driving gear for oscillating the saw carriage together with fragments of the machine frame in which the shaft thereof is journaled.

Figure 3 represents a view partly in section and partly in elevation of a fragment of a crank-wheel and crank-pin adjustable thereon together with means for securing the said crank-pin to the said crank-wheel; the same being taken apart to reveal details of construction and illustrate the manner of assembling and adjusting the parts thereof.

Figure 4 represents a view of a fragment of the length gage in another aspect than that shown in Figure 1.

The saw carriage 1 is pivotally mounted upon the shaft 2 secured in the frame 3; a motor 4 mounted upon the carriage 1 carries and drives the saw 5. A pitman 6 in the form of a turnbuckle is pivotally attached to the carriage 1 at 7 and to the crank-pin 8. The crank-pin 8 is formed upon and is integral with a disk 9 perforated with several holes as 10 and from whose opposite face the screwed pivot 11 projects.

The pivot 11 extends through a hole 12 in the crank-wheel 14 and is secured thereto by the clamping action of the nut 15 and fixed in position relative thereto by the device 16 consisting of a perforate portion 17 and radial portion 18 carrying the pin 19 integral therewith embracing the pivot 11 at its perforate end and engaging the holes 20 and 10 in the crank-wheel 14 and disk 9 respectively at its opposite end.

The crank-wheel 14 is formed with a smooth external face adapted to be engaged by the friction roll 22 and a relatively heavy sector 23 diametrically of the hole 12 through which the pivot 11 extends, constituting a counterbalance to the heavy reciprocating and oscillating parts connected thereto. The shaft 24 to which the crank-wheel 14 is rigidly attached is journaled in the frame 3.

Parallel to the shaft 24 and separated therefrom, an eccentric shaft 25 is journaled in the frame 3. Upon the larger and eccentric portion of the shaft 25 the rigidly connected friction roll 22 and friction disk 26, are rotatably mounted. Two annular pieces 27 and 28 formed with arms 29, 30, and 31 are rigidly secured to the shaft 25 and constitute a thrust bearing for the friction roll and disk 22 and 26 respectively. A thrust spring 32 interposed between the annular pieces 27 and 28 and the frame 3 is also mounted upon the shaft 25.

This spring 32 is in compression and serves to impel the shaft 25 through the medium of the rigidly attached pieces 28 and 27 in an axial direction so as to hold the friction disk 26 in contact with the slidable friction wheel 34.

The friction wheel 34 is mounted on the shaft 35, perpendicularly disposed to the shafts 24 and 25, so as to be slidable axially thereof though impelled in rotation by a suitable key engaging a groove in the shaft 35, and is fitted with a rotating grooved piece 36, and loose collar 37 with nogs. A control lever 38, fitted with a set screw 39 to engage the part of the frame 40 for securing it in position and pivoted to the frame at 41, engages at its lower end bifurcated end the nogs of the loose collar 37.

The shaft 35 is journaled in suitable bearings 42 and 43 in the frame 3 and carries a pulley 44 to which a motor not shown is belted.

The eccentrically mounted shaft 25 constitutes the means for engaging or disengaging the friction roll 22 with the crank-wheel 14; this is accomplished by rotating it one way or the other by means of depressing the treadle 46 connected therewith through the lever 47, rod 48 and bifurcated lever 31, or releasing the treadle 46 when the counterweight 49 acting through its lever 29 and collar 28 integral therewith and secured to the shaft 25 causes a reverse rotation to disengage them.

The same action may be caused by the withdrawal or release of the control handle 50 connected to the shaft 25 through the rod 51 extending through the annular terminus 52 of the bifurcated lever 31 and engaging it through the medium of the spring 53 retained by the nuts and washer 54. The control handle 50 is formed with a perpendicularly disposed flat portion 58 in whose lower edge two notches 59 and 60 are provided to engage the frame 3 to secure the control handle 50 in the engaged, or disengaged position when the saw carriage will oscillate continuously, or remain idle respectively.

An arm 30 integral with the collar 27 and bifurcated lever 31 extends to the rearward and fitted with an adjustable contact screw to engage the brake lever 62 adjustably secured to the shaft 63 journaled in the frame 3. A lever 64 bearing the counterweight 65 is also secured to the shaft 63 and supplies the braking force applied through the brake shoe 66 to arrest the motion of the crank-wheel 14 upon the disengagement of the friction roll 22 therefrom.

The brake-shoe 66 is mounted upon a suitable holder 67 in turn attached to an arm or lever 68 rigidly secured to the shaft 63.

The length gage consists of a shaft 70 journaled in standards as 72 secured to the table top 71. A handle 73 is secured to the shaft 70. Several stop-arms as 74 and 75 are clamped along the bar at desired positions. Each arm is provided with two stop-screws 76 and 77 equidistant from the shaft 70 but angularly separated. The bar 70 may be of any desired length and any number of stops desired may be used. The stop-screws are disposed at such a distance from the shaft 70 as will provide for the alignment thereof with the corner 78 contained between the base of the standard 72 and the table top 71 so that a board may be slid along the table top against the bases of the standards as 72 to make contact with any stop screw apposed with the corner 78 without striking another; this apposition of the stop-screws with the corner 78 is effected by rotation of the shaft 70.

It will be apparent that the rate of oscillation of the saw carriage may be varied at will by adjustment of the lever 38 without stopping the machine, and that the carriage may be made to oscillate continuously by withdrawing the control handle 50 and securing it, or control of the carriage returned to the treadle 46 by releasing the handle 50, and that upon the disengagement of the carriage from the power driving mechanism its motion will be arrested by operation of the brake connected in the manner described with the control devices.

It is sometimes desirable to not only hasten the speed of the carriage oscillations but also to shorten the amplitude thereof to permit of even a greater frequency of oscillation with the same power. It is obvious that more power is required to drive the carriage at a high rate of speed than at a low rate and that rapid oscillations through a long stroke of the carriage entail great strains in the bearings and supporting members. It is thus not practicable to provide a single, fixed amplitude of oscillation of the carriage for all speeds at which it is practicable to handle all sizes of lumber through the machine as this would involve the provision of very great power for the rapid cutting of small sticks while a small fraction of this power would be required to drive the carriage at that rate at which it is possible to handle the heavier pieces.

This required shortening of the stroke of the carriage for high rates of oscillation without increasing the power is provided for in the machine of my invention by the adjustable disk 9 which may be rotated upon the crank-wheel 14 by removing the nut 15 and disengaging the pin 19 to any one of several selective positions providing for the adjustment of the crank-pin 8 closer to the shaft 24.

Now it will be observed that the mere shortening of the stroke of the saw and carriage will not suffice. The gage remains stationary upon the table and the lumber must be fed against the gage. The reduction of the diameter of the circle in which the crank-pin revolves provides for the oscillation of the carriage and saw about the same central point as before and the saw would not traverse the width of a board held against the gage. To compensate for this shift of the forward limit of travel of the saw, the adjustable pitman 6 has been provided. This pitman may be extended to adjust the forward limit of travel of the saw to insure a full cut.

It will be quite evident that the adjustment of the length of stroke of the saw-carriage and the adjustment of the position of that stroke as related to the gage as just explained may not be accomplished while the machine is in operation, however, these adjustments may be made without undue loss of time and the machine made ready for the class of work in prospect, either in the mill where it is already in use or at the factory before being shipped to meet the requirements of a particular manufacturer whose work may differ greatly from another manufacturer having need for a machine of this character.

The particular advantage of the elective foot or automatic control of the stroke of the saw accrues out of the practical difficulties in cutting out clear stock from mill run lumber. An operator may observe that the next board to be cut is all clear and in this case he would pull out the handle 50 allowing the carriage to oscillate at regular intervals at a speed at which it is convenient for him to handle the lumber against the gage, the speed being regulated by the lever 38.

The next board may be defective in many places and require turning several times in the course of cutting to detect these defects: in this case he will resort to the foot control. Another board may be narrower and therefore much lighter to handle, and he would in this case shift the lever 38 to a faster speed.

Again, a particular board may not be suited to cut up economically into the fixed dimensions of one size and style of box for example, but contain clear pieces of lengths, adapted to several different sizes and styles of boxes differing in dimensions by small fractions of an inch. Now it will be understood that while individual stops may be set upon the bar close enough together to gage lengths differing by more than the thickness of the stops themselves, individual stops may not be used to gage lengths differing by less than the thickness of the stops.

Since boards are handled against the stops with considerable force, these stops must be of sufficient strength and therefore thickness to avoid breakage and to withstand the clamping pressure necessary to insure them against displacement. But in the machine of my invention two or more stop-screws are used in each stop-arm and these may be adjusted to gage different lengths of any range no matter how similar these different lengths may be.

It is evident therefore that all of the effects described contribute to the special utility of this machine and that its use affords many economies of labor, material, and maintenance.

Having described my invention what I claim is:

1. A sawing machine comprising a power oscillated saw carriage, a friction wheel and adjustable crank connected to said carriage, a friction roll for engaging said friction wheel, an eccentrically journaled shaft carrying said friction roll and a friction disk rigidly connected thereto, a spring fitted on said shaft to impel it, the roll, and the disk in an axial direction, and a power driven slidable friction roll making contact with the friction disk to variably drive the first mentioned friction roll.

2. A sawing machine comprising a power oscillated saw carriage, a friction wheel and adjustable crank connected to said carriage, a friction roll for engaging said friction wheel, an eccentrically journaled shaft carrying said friction roll and a friction disk rigidly connected thereto, a spring fitted on said shaft to impel it, the roll, and the disk in an axial direction, a power driven slidable friction roll making contact with the friction disk to variably drive the first mentioned friction roll, a treadle and handle connected to said eccentrically journaled shaft to cause a partial rotation thereof to effect the engagement of the said friction roll mounted thereon with the said friction wheel, and means to secure said handle in the engaged or disengaged positions.

3. A sawing machine comprising a power oscillated saw carriage, a friction wheel and adjustable crank connected to said carriage, a friction roll for engaging said friction wheel, an eccentrically journaled shaft carrying said friction roll and a friction disk rigidly connected thereto, a spring fitted on said shaft to impel it, the roll, and the disk in an axial direction, a power driven slidable friction roll making contact with the friction disk to invariably drive the first mentioned friction roll, a treadle and handle connected to said eccentrically journaled shaft to cause a partial rotation thereof to effect the engagement of the said friction roll mounted thereon with the said friction wheel, means to retain said handle in the engaged or disengaged position, and a gage consisting in suitable standards in which a shaft is rotatably mounted, a control handle secured thereto and a plurality of stop arms fitted with a plurality of stop screws of different length.

4. A sawing machine comprising a power oscillated saw carriage, a friction wheel and adjustable crank connected to said carriage, a friction roll for engaging said friction wheel, an eccentrically journaled shaft carrying said friction roll and a friction disk rigidly connected thereto, a spring fitted on said shaft to impel it, the roll, and the disk in an axial direction, a power driven slidable friction roll making contact with the friction disk to variably drive the first mentioned friction roll, a brake disposed to engage the rim of said friction wheel, a treadle and handle connected to said eccentrically journaled shaft and to said brake to cause a partial rotation of the former to effect the engagement of the said friction roll mounted thereon with the said friction wheel and the disengagement of the said brake with said friction wheel, and means to secure said handle in the engaged or disengaged positions.

ORRIN K. HILL.